May 25, 1937.                W. DISSLER.                2,081,739
                           SENSITIVITY METER
                         Filed April 23, 1935

INVENTOR
WALTER DISSLER
BY
ATTORNEY

Patented May 25, 1937

2,081,739

UNITED STATES PATENT OFFICE 2,081,739

SENSITIVITY METER

Walter Dissler, Berlin, Germany, assignor to Telefunken Gesellschaft für Drahtlose Telegraphie, Berlin, Germany Application April 23, 1935, Serial No. 17,773
In Germany April 20, 1934

4 Claims. (Cl. 250—20)

The present invention is concerned with a sensitivity meter, especially for measuring the overall or aggregate amplification of tubes.

For measuring amplification or gain of receiving apparatus, methods have been disclosed in the prior art in which the input amplitude is manually regulated by way of voltage dividers or series resistances, with the resultant output amplitude of the apparatus being read in a special indicator device, the aggregate amplification being ascertained by calculation on the basis of a comparison of the two values. Now, this method is rather tedious and time-consuming, and it presupposes a good deal of skill in manipulation, not to mention the fact that the calculation of the gain is liable to involve errors.

An essential simplification of the test method is obtainable according to this invention by the aid of a sensitivity meter which is characterized by the feature that the amount of energy put into the input circuit of a set is automatically regulated as a function of the energy available in the output circuits.

The present invention which is preferably used for measuring the gain of broadcast receiver apparatus shall be explained in more detail by reference to a tube-equipped apparatus.

Figure 1:
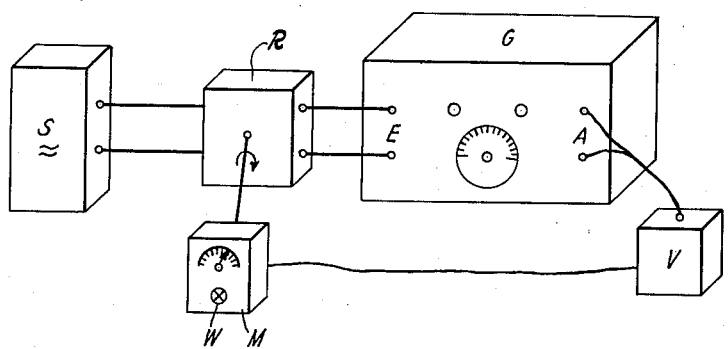
Figure 2:
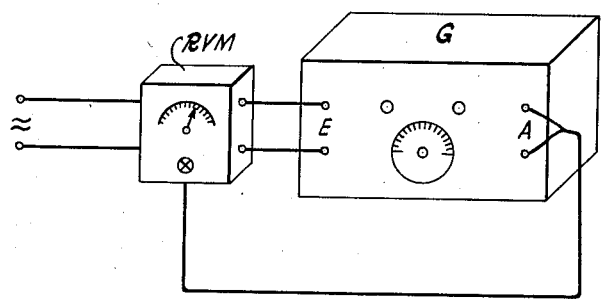

In the drawing Figure 1 illustrates diagrammatically a preferred form of the invention, and Figure 2 illustrates a simplified form of the invention wherein several components of the arrangement shown in Figure 1 are combined in a single inclosure.

Suppose that to the input terminals E of a broadcast receiver apparatus G an RF potential is fed from a measuring (standard) transmitter S by way of a regulator, say, in the form of a condenser, the said voltage being varied within certain limits corresponding to the particular conditions of reception.

So far as the present invention is concerned it is immaterial in what particular way the set G has been built. What is important is that the amount of energy $N_A$ available at the output terminals A should be proportional to the input energy $N_E$. Between both values there prevails this relation.

$$N_E . k = N_A$$

In the test method the factor of proportionality $k$, i. e., the gain is to be ascertained automatically. For this purpose, a combination measuring and adjusting device M is actuated by the output energy of the set G, the said device M being associated with a variable input regulator, say, a rotary condenser, coil coupling means, or potentiometer. The driving system of the measuring device may be similar in construction to that of a wattmeter. However, in order that a powerful torque may be obtained it is recommendable to choose a moving-coil type of measuring system comprising permanent magnets. This form of construction requires prior rectification of the A. C. energy in a rectifier V. The input regulator R being in coupling relation with the measuring and adjuster device is so set that, in the presence of large output amplitudes the amplitudes fed to the input are small, and vice versa. The moving-coil measuring system, therefore, will experience a rotational motion until the equation above indicated is fulfilled. If upon the identical spindle is mounted an indicator hand or pointer and if the latter is caused to wipe over a previously graduated scale then it will be feasible to read directly the gain or proportionality factor $k$. Instead of a rotary movement in the measuring and adjusting system, it is also possible, if required, to have recourse to a reciprocating movement.

The sensitivity meter of this invention offers the advantage that also untrained persons are enabled to effect a test of a set, inasmuch as no skill of manipulation or calculation is required. The overall amplification of the apparatus in dependence upon the wave-length may be read immediately, if the calibrated or standard transmitter and the receiver apparatus have been set to the identical wave-length. With a fixedly adjusted receiver, and upon varying the transmitter frequency by small amounts, say, to within ±0.9 kc., it is feasible to ascertain, directly from the gain values, the selectance. The quality or merit curve of a receiver set is determinable with the sensitiveness meter of this invention in the same simple manner if the transmitter is modulated with a potential of constant value, but a frequency variable within an audible range. If in parallel relation to the moving coil of the device above referred to, or in series therewith, a resistance W is provided, it is possible to alter the sensitiveness ad lib., in order to measure, say, in receiver sets furnished with fading regulation means, the amplification factor in the presence of small or very great input amplitudes. The circuit elements required for fading control in this scheme may be adjusted accurately so that later, during normal receiving conditions, in the presence of changing input amplitudes, an approximately constant output amplitude may be secured. By the aid of the resistance it is also possible to adapt the measuring range of the sensitivity meter to every type of apparatus, in other words, to varying average or mean gain values.

For constructional and electrical reasons it is useful to combine the input regulator R, the rectifier V, and the measuring and adjusting device M within one and the same device RVM as shown in Figure 2. In this instance, it is recommendable to shield the input regulator which preferably has the form of a rotary condenser with a logarithmic frequency characteristic from the rest of the assembly making up the measuring device electrostatically in order to keep RF away from the receiver by way of the AF part. For the rectification of the output energy there is preferably employed a type of rectifier furnished with a stopping layer (cuprous oxide).

I claim:

1. The method of measuring the over-all amplification characteristic of an amplifier which comprises impressing energy upon the input of the amplifier and utilizing the energy output of the amplifier to automatically vary the amount of energy impressed upon the input of the amplifier to such a value that the amount of output energy assumes a predetermined value and measuring the amount the input energy is varied from a predetermined value thereof.

2. A method of measuring the selectance characteristics of a receiver which comprises adjusting the receiver to receive energy of a predetermined frequency generating carrier energy, incrementally varying the frequency of the generated carrier energy through a range of frequencies which includes the frequency to which the receiver is adjusted and frequencies both above and below said frequency, utilizing the energy output of the amplifier to automatically vary the amount of energy impressed upon the input of the receiver to such a value that the amount of output energy assumes a predetermined value at each of the increment points and measuring the amount the input energy is varied from a predetermined value at each of the increment points.

3. Apparatus for testing certain characteristics of amplifiers and the like comprising a source of energy, a variable coupling device for connecting the source to the amplifier input, an electrodynamic device, means for feeding the amplifier output to the electrodynamic device, means operatively connecting the electrodynamic device and the variable coupling device whereby the variable coupling device is operated in accordance with the amplifier output fed to the electrodynamic device, said electrodynamic device being provided with means for indicating the extent of its operation of the variable coupling device.

4. Apparatus such as described in the next preceding claim characterized by that rectifying means is included in the feeding means between the amplifier output and the electrodynamic device.

WALTER DISSLER.